United States Patent [19]

Scoggins

[11] 3,839,301

[45] Oct. 1, 1974

[54] POLY(ARYLENE SULFIDE) RESIN HEAT TREATMENT AND CURING

[75] Inventor: Lacey E. Scoggins, Bartlesville, Okla.

[73] Assignee: Phillips Petroleum Company, Bartlesville, Okla.

[22] Filed: July 23, 1973

[21] Appl. No.: 381,551

[52] U.S. Cl. ............... 260/79, 260/45.7 S, 260/79.1
[51] Int. Cl. ............................................. C08g 23/00
[58] Field of Search .................... 260/79, 79.1, 45.7

[56] References Cited
UNITED STATES PATENTS 3,562,199  2/1971  Hill, Jr. et al. ..................... 260/79.1
3,699,087  10/1972  Wood et al. ....................... 260/79.1

*Primary Examiner*—Melvyn I. Marquis

[57] ABSTRACT

The processing characteristics of poly(arylene sulfide) resins are improved by incorporating therein a small effective amount of at least one sulfur-containing compound selected from sulfur acids and sulfonyl halides and heating at a temperature below the melting point of the polymer under an inert atmosphere. The aromatic sulfide polymers treated in accordance with the invention retain their thermoplastic nature and can be used in a variety of industrial applications, e.g., as molding compositions.

10 Claims, No Drawings

POLY(ARYLENE SULFIDE) RESIN HEAT TREATMENT AND CURING

This invention relates to aromatic sulfide polymers having improved processing characteristics. In accordance with another aspect, this invention relates to curable poly(arylene sulfide) resins having incorporated therein a finite, but small, amount of at least one sulfur-containing compound selected from sulfuric acid, sulfonic acids and sulfonyl halides. In accordance with another aspect, this invention relates to a process for decreasing the melt flow of arylene sulfide polymers by incorporating a small amount of at least one of sulfur acids and sulfonyl halides and heating. In accordance with another aspect, this invention relates to the production of arylene sulfide polymers characterized by low melt flow which can be molded and which possess high temperature stability. In accordance with a further aspect, this invention relates to poly(phenylene sulfide) resins having incorporated therein a melt flow reducing amount of at least one of sulfur acids and sulfonyl halides so as to effect a reduction in the melt flow of the polymer under the influence of heat and an inert, non-oxidizing atmosphere.

Aromatic sulfide polymers ranging in consistency from viscous liquids to crystalline solids are known. While such polymers exhibit desirable properties for many applications such as molding compositions, the unmodified polymers normally possess a relatively high melt flow, e.g., above 1,000, which inhibits their use. For example, when exposed to process temperatures above their melt point, the unmodified polymers tend to substantially degrade or, at the least, require excessive processing times. Since the desirable properties make the polymers extremely useful, it would be advantageous to improve the processability of the solid polymers without materially affecting desirable properties. Additionally, while polymers of this type exhibit desirable properties for many applications such as molding compositions, the unmodified polymers, e.g., obtained directly from the reactors, normally possess a high melt flow which limits their use in certain instances. Such polymers, i.e., the unmodified materials, possess a very low melt viscosity which makes it difficult to handle them by conventional molding practices.

Unexpectedly, I have discovered that a certain class of additives can be employed for curing and decreasing the melt flow of sulfur-containing polymers without causing any appreciable loss in desirable properties. The resulting polymer thus obtained is a stable, resinous material which remains sufficiently thermoplastic to further pressure mold and shape, press into sheet or draw or extrude into fibers. The sulfur-containing polymeric materials which are modified according to the invention do not degrade materially at normal processing temperatures and can be readily formed into useful molded articles.

Accordingly, an object of this invention is to improve the processing chracteristics of poly(arylene sulfide) resins.

A further object of this invention is to provide poly(arylene sulfide) resins having improved molding and extruding characteristics.

A further object of this invention is to provide a curing additive for poly(arylene sulfide) resins.

A further object of this invention is to provide a melt flow reducing additive for poly(arylene sulfide) resins.

A still further object of this invention is to improve the processing characteristics of poly(arylene sulfide) resins by reducing the melt flow without substantially altering the other physical properties of the resin.

Other objects and aspects as well as the several advantages of the invention will be apparent to those skilled in the art upon reading the specification and the appended claims.

In accordance with the invention, a curing and melt flow reducing amount of at least one sulfur-containing compound selected from sulfur acids and sulfonyl halides is incorporated into poly(arylene sulfide) resins.

In accordance with one embodiment of the invention, the melt flow of thermoplastic poly(arylene sulfide) resins is decreased by heating the resins at a temperature below the melting point of the polymer in the presence of at least one sulfur-containing compound selected from sulfur acids and sulfonyl halides under an inert atmosphere.

In accordance with another embodiment of the invention, a poly(arylene sulfide) resin composition capable of being cured to a free-flowing particulate product is provided comprising a poly(arylene sulfide) resin having incorporated therein a finite amount sufficient to reduce the melt flow and effect cure of the polymer of at least one sulfur-containing compound chosen from selected sulfur acids and sulfonyl halides.

In accordance with a further embodiment of the invention, the melt flow of poly(phenylene sulfide) resins is decreased and the resin is cured by heating the polymer in an inert, non-oxidizing atmosphere in the presence of a melt flow modifier comprising sulfuric acid or a benzene sulfonic acid at a temperature below the melting point of the polymer for a time sufficient to effect a substantial decrease in the melt flow of the polymer molecules.

It has been found, according to the invention, that an improved class of poly(arylene sulfide) resins can be obtained by heating sulfur-containing polymers such as disclosed and claimed in Edmonds et al., U.S. Pat. No. 3,354,129, at a temperature below the melt point of the resin for a time sufficient to effect a reduction in the melt flow of the resin in the presence of at least one melt flow modifier selected from sulfuric acid, sulfonic acids and sulfonyl halide. The so modified polymer is a stable resinous material which retains its original physical appearance, e.g., particulate shape, and remains sufficiently thermoplastic to form into shaped objects as by injection or compression molding, with substantially reduced processing times. The poly(arylene sulfide) resins which are modified according to the invention do not degrade materially at normal processing temperatures and exhibit improved processability at such temperatures.

It is to be understood that the properties of the polymeric material modified according to the invention can vary considerably depending upon the nature of the starting material, such as the molecular weight, melt viscosity, and the like. The length of time and temperature of the heat treatment can also be used to vary the properties within wide limits, it being understood that even after the mildest treatment some improvement in heat stability and processing capability is obtained.

The present invention is useful with poly(arylene sulfide) resins generally regardless of the method of preparation. The invention is particularly useful with polymers prepared by the solution reaction of polyhalo compounds with alkali metal sulfides as described in U.S. Patent 3,354,129. Such poly(arylene sulfide) resins are produced by the reaction of a polyhaloaromatic compound with a mixture in which an alkali metal sulfide is contacted with an amide.

The melt flow modifiers or curing agents that can be employed according to the invention are sulfur-containing compounds chosen from sulfuric acids and selected sulfonic acids and sulfonyl halides.

Specifically, sulfuric acid and a typical, representative disulfonic acid, m-benzenedisulfonic acid, have been found to be effective in reducing polymer melt flow and effecting cure as shown by the examples below.

Structurally similar disulfonic acids having the general formulas given below and their sulfonyl halide analogs suggest themselves to those skilled in the art as additional effective curing agents of this invention:

Disulfonic acids or disulfonyl halides of the formula

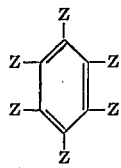

where at least two Z positions but not more than four Z's are (SO₃H) or (SO₂X) groups and the remaining Z groups are either hydrogen or alkyl groups having 1–20 carbon atoms, and X is a halogen such as chlorine, bromine or iodine;

Polysulfonic acids or polysulfonyl halides derived from naphthalene, anthracene, and phenanthrene containing 2–4 sulfonic acid or sulfonyl halide groups and alkyl substituted derivatives containing from 1–20 carbon atoms in each alkyl group;

Paraffinic disulfonic acid or disulfonyl halides (HSO₃)R(HSO₃) or (SO₂X)R(SO₂X) in which R is a straight chain or branched chain radical having 6–20 carbon atoms, X is a halogen such as chlorine, bromine or iodine, and in which the functional groups are on each of the terminal carbon atoms; and Disulfonic acid or disulfonylhalides of bisaromatic compounds, ketones, thioketones, ether, thioether, or amines having the general formula

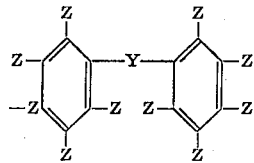

where Z is as defined above, i.e., at least two but not more than four are sulfonic acid or sulfonyl halide groups and Y is a carbon bond between two aromatic carbon atoms,

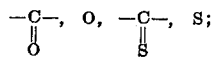

the Z groups preferably are in para position relative to the Y bond.

Specific examples of sulfur acids or sulfonyl halides described generically above include sulfuric acid, 1,3-benzenedisulfonic acid, m-toluenedisulfonic acid, 1,4-diethylbenzene-2,6-disulfonic acid, nonylbenzene-1,4-disulfonic acid, 2,4-didodecylbenzene-1,3-disulfonic acid, eicosylbenzene-1,4-disulfonic acid, 1,4-benzene disulfonyl chloride, octylbenzene-1,4-disulfonyl bromide, m-toluenedisulfonyl iodide, m-xylene-2,4-disulfonyl chloride, 1,3,5,7-naphthalenetetrasulfonic acid, 1,5-naphthalenedisulfonic acid, 1,5-anthracenedisulfonic acid, 1,8-anthracenedisulfonyl bromide, 1,8-phenanthrenedisulfonic acid, 1,6-hexanedisulfonyl iodide, 1,12-dodecanedisulfonic acid, 1,8-octadecanedisulfonic acid, 1,20-eicosanedisulfonyl chloride, p,p'-biphenyldisulfonic acid, p,p'-benzophenonedisulfonic acid, p,p'-benzothiophenonedisulfonyl chloride, p,p'-diphenyletherdisulfonic acid, p,p'-diphenylthioetherdisulfonyl chloride, and the like.

Of the above-mentioned sulfur-containing compounds, the disulfonic acids and sulfuric acid are presently preferred. The sulfonyl halides are less preferred because of the evolution of HCl and accompanying corrosion and pollution problems which require special handling precautions.

The amount of sulfur acid or sulfonyl halide present in the mixture of modifier and polymer according to the invention will be sufficient to substantially reduce the melt flow and effect cure of the polymer. The amount of modifier used will depend mainly upon the chosen polymeric product and the decrease in melt flow or degree of cure desired and upon other variables selected by one skilled in the art. Generally, the amount of sulfur acid or sulfonyl halide incorporated into the polymers of arylene sulfides will range from 0.1 to about 10 weight percent of the polymer, preferably 1 to about 5 percent by weight of the polymer. Particularly beneficial decreases in melt flow have been obtained with about 2 to about 5 weight percent of the sulfur acids or sulfonyl halides, based on total polymer.

The process of the invention can be carried out by forming a homogenous dispersion of at least one of the above-defined polymeric materials and at least one sulfur acid or sulfonyl halide. Formation of the dispersion can be carried out in any suitable manner, but preferably it is accomplished by mixing the two components in the presence of an aqueous dispersing medium. A slurry of polymer and sulfur acid or sulfonyl halide additive in an aqueous medium is agitated to form a homogenous mixture in a manner so as to minimize evaporation of the dispersing medium during mixing. The dispersing medium can subsequently be readily removed by evaporation when subjected to heating to effect cure and reduction of melt flow of the polymer.

In accordance with the invention, a mixture of polymer and sulfur-containing compounds as defined herein is heated to a temperature which is below the melting point of the chosen polymeric product for a period of time sufficient to effect cure and reduce the melt flow. The melt point of arylene sulfide polymers can be readily determined by differential thermal analysis (DTA) by heating a 10 mg sample of the polymer at a rate of 10°C per minute. The melt point is taken from the DTA thermogram in a conventional manner. This temperature will vary from the range of about 200°F to about 800°F depending upon the molecular weight of the polymeric product being treated in accordance with the invention. Generally, the treatment temperature will be in the range of from about 25° to 250°F, preferably 25° to 150°F, below the melting point of the polymer being treated. The time during which the mixture is held at such a temperature will be sufficient to effect cure and reduce the melt flow and will range ordinarily from a few minutes to several days, usually from about 30 minutes to about 5 hours with the longer times being used at lower temperatures and vice versa. The preferred time for a poly(phenylene sulfide) resin, for example, is from 30 minutes to about 5 hours at a temperature ranging from about 40° to about 90°F below the melt point of the polymer. The heating is carried out in the presence of an inert non-oxidizing atmosphere such as nitrogen or other suitable inert materials such as helium or argon.

If desired, a molded product can be made directly by heating a homogeneous mixture of a polymer and a sulfur acid or sulfonyl halide in a mold which has the shape of the desired product. This method is useful when the desired product is of such high molecular weight that it is difficult to melt.

The polymers of reduced melt flow produced by the process of this invention can be molded into a variety of useful articles by molding techniques which are well known in the art. Molding should be carried out above the melting point or softening point, but below the decomposition point, of the particular polymer being molded. Suitable molding techniques include injection molding, compression molding, vacuum forming, extrusion, and the like. Non-meltable polymers can be fabricated by means of a binder or by sintering technique using powder molding as used in powder metallurgy.

The polymers of this invention have utility in any use wherein high melting point and/or high temperature stability is desired. These polymers can be blended with fillers, pigments, stabilizers, softeners, extenders, and other polymers. Such fillers as graphite, carbon black, titania, glass fibers, metal powders, magnesia, asbestos, clays, mica, and the like can be employed.

EXAMPLE I

A poly(phenylene sulfide) resin prepared by the reaction of p-dichlorobenzene and a mixture in which sodium sulfide was contacted with N-methylpyrrolidone at 250°C for three hours was used. The recovered polymer, which had a melting point of 280°C (536°F) was used for a series of curing runs at 510°F for 4 hours using varying amounts of sulfuric acid. It had a melt flow of 4008 before any curing test was made.

An aqueous slurry of this polymer was prepared and sufficient 98% sulfuric acid was added to give the desired final concentration in the dried polymer. The slurry was dried to a powder by slow evaporation of the water at about 200°F in a current of warm dry air.

The polymer was then placed in an oven and heated to 510°F for four hours under a nitrogen sweep.

The melt flow of the cured polymers was determined by modified ASTM D-1238-65T condition B to operate at 343°C (650°F) and 5,000 g load. The results are tabulated below:

TABLE I

| Run | g$H_2SO_4$/100 g PPS* | Melt Flow, g/10 min (5000 g load) |
|---|---|---|
| 1 | 0 (Control) | 4008 (no change) |
| 2 | 2.5 | 804 |
| 3 | 3.0 | 88 |
| 4 | 3.75 | 10 |
| 5 | 5.0 | 0 |

*PPS - poly(phenylene sulfide)

The above table demonstrates that at constant temperature and duration, under an inert atmosphere, the melt flow can be controlled by the amount of curing agent ($H_2SO_4$) added to the base resin.

EXAMPLE II

In the same manner as described for Example I, another series of tests was conducted under the same conditions using m-benzenedisulfonic acid as the curing agent. The results are tabulated below:

TABLE II

| Run | g acid/100 g PPS* | Melt Flow |
|---|---|---|
| 1 | 0 | 4008 |
| 2 | 3 | 177 |
| 3 | 7 | 4 |

*PPS - poly(phenylene sulfide)

The results again demonstrate that the melt flow of the resin is decreased by increasing the amount of curing agent in the resin at constant time and temperature.

While it is known that oxygen will act as a curing agent for these resins, the reason for excluding oxygen in this process is for improved control of the depth or extent of the cure and to assure a more uniform cure throughout the mass of polymer.

I claim:

1. A heat curable poly(arylene sulfide) resin composition capable of being cured to a material exhibiting reduced melt flow characteristics comprising a mixture of a poly(arylene sulfide) resin and an effective amount sufficient to substantially reduce the melt flow and effect cure of said resin of at least one sulfur-containing compound selected from sulfuric acid, poly sulfonic acids and poly sulfonyl halides.

2. A composition according to claim 1 wherein the sulfur-containing compound is sulfuric acid or a polysulfonic acid or a polysulfonyl halide of the formula

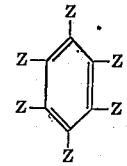

wherein at least two Z positions but not more than four Z's are ($SO_3H$) or ($SO_2X$) groups and the remaining Z groups either hydrogen or alkyl groups having 1–20 carbon atoms, and X is a halogen.

3. A composition according to claim 1 wherein the amount of said sulfur-containing compound in said composition ranges from 0.1 to about 10 weight percent of the polymer.

4. A composition according to claim 1 wherein said polymer is poly(phenylene sulfide) and said sulfur-containing compound is sulfuric acid.

5. A composition according to claim 1 wherein said polymer is poly(phenylene sulfide) and said sulfur-containing compound is m-benzenedisulfonic acid.

6. A cured poly(arylene sulfide) resin product formed upon heating the composition of claim 1.

7. A molded product formed from the cured composition of claim 6.

8. A process for decreasing the melt flow of poly (arylene sulfide) resins which comprises:
   a. mixing together a particulate poly(arylene sulfide) resin and at least one sulfur-containing compound selected from sulfuric acid, polysulfonic acids and polysulfonyl halides as a curing agent, the amount of said sulfur-containing compound present being sufficient to substantially reduce the melt flow and effect cure of said resin, and
   b. subjecting the mixture of said resin and said sulfur-containing compound obtained in step (a) to a temperature high enough to effect curing but at least 25° below the melting point of said resin for a period of time sufficient to crosslink said resin and form a free-flowing cured particulate poly(arylene sulfide) resin product exhibiting reduced melt flow characteristics.

9. A process according to claim 8 wherein the temperature to which said mixture is heated is in the approximate range of 25° to 250°F below the melting point of the polymer and said heating is carried out in the presence of a non-oxidizing inert atmosphere for a finite period of time sufficient to substantially reduce the melt flow of said polymer.

10. A process according to claim 8 wherein the resin and sulfur-containing compound in step (a) are dispersed in an aqueous medium which medium is subsequently removed by evaporation at a temperature of at least 25°F below the melting point of said resin but at conditions insufficient to effect any substantial cure of the resin.

* * * * *